(12) United States Patent
Sallas

(10) Patent No.: US 9,874,650 B2
(45) Date of Patent: Jan. 23, 2018

(54) METHODS AND SYSTEMS FOR SEISMIC IMAGING USING CODED DIRECTIVITY

(71) Applicant: CGG SERVICES SA, Massy (FR)

(72) Inventor: John Sallas, Plano, TX (US)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/911,564

(22) PCT Filed: Sep. 11, 2014

(86) PCT No.: PCT/EP2014/069366
§ 371 (c)(1),
(2) Date: Feb. 11, 2016

(87) PCT Pub. No.: WO2015/036468
PCT Pub. Date: Mar. 19, 2015

(65) Prior Publication Data
US 2016/0202379 A1 Jul. 14, 2016

Related U.S. Application Data

(60) Provisional application No. 61/876,811, filed on Sep. 12, 2013.

(51) Int. Cl.
*G01V 1/38* (2006.01)
*G01V 1/00* (2006.01)

(52) U.S. Cl.
CPC ............ *G01V 1/3808* (2013.01); *G01V 1/005* (2013.01); *G01V 1/006* (2013.01); *G01V 1/3861* (2013.01); *G01V 2210/127* (2013.01); *G01V 2210/1214* (2013.01)

(58) Field of Classification Search
CPC ..... G01V 1/005; G01V 1/3861; G01V 1/3808; G01V 1/006; G01V 2210/1214; G01V 2210/127
USPC ..................................................... 367/15, 21
See application file for complete search history.

(56) References Cited

U.S. PATENT DOCUMENTS

| 3,346,068 A | 10/1967 | Woods et al. |
| 4,146,870 A | 3/1979 | Ruehle |
| 4,357,689 A | 11/1982 | Ruehle |
| 4,918,668 A | 4/1990 | Sallas |

(Continued)

FOREIGN PATENT DOCUMENTS

| GB | 1583042 | 1/1981 |
| WO | 2014/198865 A2 | 12/2014 |

OTHER PUBLICATIONS

International Search Report in related International Application No. PCT/EP2014/069366, dated Apr. 10, 2015.
(Continued)

*Primary Examiner* — Daniel L Murphy
(74) *Attorney, Agent, or Firm* — Patent Portfolio Builders PLLC

(57) ABSTRACT

Method, source array and seismic vibro-acoustic source element for seismic data acquisition. The number of beams of acoustic energy to be generated for the seismic data acquisition are determined or selected. A different pilot signal is generated for each of the number of beams of acoustic energy. A plurality of drive signals are generated using the different pilot signals. An array of source elements are driven using the plurality of drive signals to generate the two or more beams of acoustic energy.

17 Claims, 12 Drawing Sheets

(56) References Cited

U.S. PATENT DOCUMENTS

| | | | |
|---|---|---|---|
| 5,281,773 A | 1/1994 | Duren | |
| 6,181,646 B1* | 1/2001 | Bouyoucos | G01V 1/005 |
| | | | 367/189 |
| 7,859,945 B2 | 12/2010 | Sallas et al. | |
| 8,837,259 B2 | 9/2014 | Ruet et al. | |
| 2009/0122645 A1 | 5/2009 | Guigne et al. | |
| 2010/0080081 A1 | 4/2010 | Morgan et al. | |
| 2012/0057732 A1* | 3/2012 | Choi | H04S 7/303 |
| | | | 381/303 |
| 2012/0120761 A1 | 5/2012 | Vu et al. | |

OTHER PUBLICATIONS

Written Opinion of the International Searching Authority in related International Application No. PCT/EP2014/069366, dated Apr. 10, 2015.

* cited by examiner

METHODS AND SYSTEMS FOR SEISMIC IMAGING USING CODED DIRECTIVITY

CROSS REFERENCE TO RELATED APPLICATION

The present application claims the benefit of priority under 35 U.S.C. §119(e) to U.S. Provisional Application No. 61/876,811 filed on Sep. 12, 2013, the entire contents of which is hereby incorporated by reference into the present application.

BACKGROUND

Technical Field

Embodiments of the subject matter disclosed herein generally relate to methods and systems and, more particularly, to mechanisms and techniques for dynamically adjusting an illumination of the subsurface during a seismic survey.

Discussion of the Background

Reflection seismology is a method of geophysical exploration to determine the properties of a portion of a subsurface layer in the earth, information that is especially helpful in the oil and gas industry. Marine reflection seismology is based on the use of a controlled source that sends acoustic energy waves into the earth. By measuring the time it takes for the reflections to come back to plural sensors, it is possible to estimate the depth and/or composition of the features causing such reflections. These features may be associated with subterranean hydrocarbon deposits.

For marine applications, sources are mainly impulsive (e.g., compressed air is suddenly allowed to expand). One of the most commonly used types of sources is an air gun which produces a high amount of acoustic energy over a short time. Such a source is towed at a certain depth by a vessel. Acoustic waves from the air gun propagate in all directions. The emitted acoustic waves' typical frequency range is between 6 and 300 Hz. However, the frequency content of the impulsive sources is not fully controllable, and different sources are selected depending on a particular survey's needs. In addition, use of impulsive sources can pose certain safety and environmental concerns.

Thus, another type of sources that may be used is vibratory sources. Vibratory sources, including hydraulically-powered, electrically-powered or pneumatically-powered sources and those employing piezoelectric or magnetostrictive material, have been used in marine operations. A positive aspect of vibratory sources is that they can generate signals that include various frequency bands, commonly referred to as "frequency sweeps." In other words, the frequency band of such sources may be better controlled, as compared to impulsive sources.

One example of such a vibratory source element is described in U.S. patent application Ser. No. 13/415,216 (herein the '216 application), filed on Mar. 8, 2012, and entitled, "Source for Marine Seismic Acquisition and Method," assigned to the same assignee as the present application, the entire content of which is incorporated herein by reference.

Source arrays (i.e., a plurality of vibratory source elements) are now used in marine seismic acquisition because they more efficiently generate acoustic energy. The source array can be towed at a single depth or at variable depths, as would be the case for a curved source array. Dual or multi-level arrays are also sometimes used to reduce the effect of spectral notches due to destructive interference with surface reflections. A source array including source elements that are uniformly distributed at a single depth and operate synchronously with identical output spectra tends to create a symmetrical directivity radiation pattern.

For example, and as shown in FIG. 1, if a single-depth source array 110 including identical source elements 108 is towed behind a vessel 101, the energy emitted by the source array tends to be symmetrical, with equal amounts of energy radiated toward vessel 101 and toward the rear of this arrangement. Because the receiver array or streamer 105, which typically includes hydrophones 106 (it can also include particle motion sensors or any sensor configured to detect seismic signals), is also towed behind vessel 101, much of the acoustic energy source array 110 radiates is not helpful for illuminating a subterranean target that might be a hydrocarbon reservoir.

This may become more problematic when trying to image a dipping reflection event 118, for example, the flank of a salt dome below the ocean bottom 116. As can be seen in FIG. 1, the energy emitted that follows ray path 112 does strike the target, i.e., the dipping reflection event 118. However, its reflection path reenters the water at an unfavorable angle so streamer 105 does not receive the acoustic energy. Thus, this energy is wasted. Note that only energy following ray path 114 arrives at streamer 105.

Additionally, source energy which is not directed in a preferred direction can be scattered by reflectors that are outside the plane of interest which can be received by the receiver array thereby creating undesirable noise artifacts. This also holds true for towed receiver arrays that contain sensors other than hydrophones, for example geophones useful for measuring particle velocity; or for surveys that employ stationary receivers like nodes or ocean bottom cables.

Thus, there is a need to provide a method that directs and maximizes acoustic energy in multiple, selective directions to better illuminate a target of interest.

SUMMARY

According to embodiments, multiple beams of acoustic energy can be generated in desired directivities to tailor illumination of a subsurface during a seismic data acquisition. The multiple beams can be generated using different pilot signals.

According to an embodiment, a method for seismic data acquisition includes the steps of determining a number of beams of acoustic energy to be generated for the seismic data acquisition, wherein the number is greater than one, generating a different pilot signal for each of the number of beams of acoustic energy, generating a plurality of drive signals using the different pilot signals, and driving an array of source elements using the plurality of drive signals to generate the two or more beams of acoustic energy.

According to another embodiment, a seismic acquisition system comprising includes a processor configured to generate a different pilot signal for each of a plurality of beams of acoustic energy, a plurality of beam form filters used to convolve the different pilot signals and to generate a plurality of drive signals using the different pilot signals; and at least one array of source elements which are driven by the plurality of drive signals to generate the plurality of beams of acoustic energy.

According to another embodiment, a non-transitory computer readable medium containing program instructions which, when executed by a suitable computer processing device, performs the steps of: generating a different pilot signal for each of a plurality of beams of acoustic energy, generating a plurality of drive signals using the different pilot signals; and driving an array of source elements using the plurality of drive signals to generate the two or more beams of acoustic energy.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a vibratory source array that includes plural individual vibratory source elements configured to generate acoustic energy in plural beams in a marine environment. However, the embodiments to be discussed next are not limited to a marine environment; they may be applied to any type of source array in which its individual elements can be independently controlled so that beam steering can be achieved or in which control of the shape, number and/or directivity of the source array's output beams is desired.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a plurality of filtered coded excitation signals are superimposed upon individual elements within a common source array, or elements from a plurality of source arrays, to form a plurality of coded radiated acoustic beams to produce different illumination angles simultaneously or to produce different synthetic illumination apertures or to produce acoustic beams with different offsets. The received data associated with the plural source beams thus generated can be deblended to form separate images that can be recombined in later processing steps and/or be used to identify data attributes, like AVO, for detection of hydrocarbon deposits.

Figure 1:
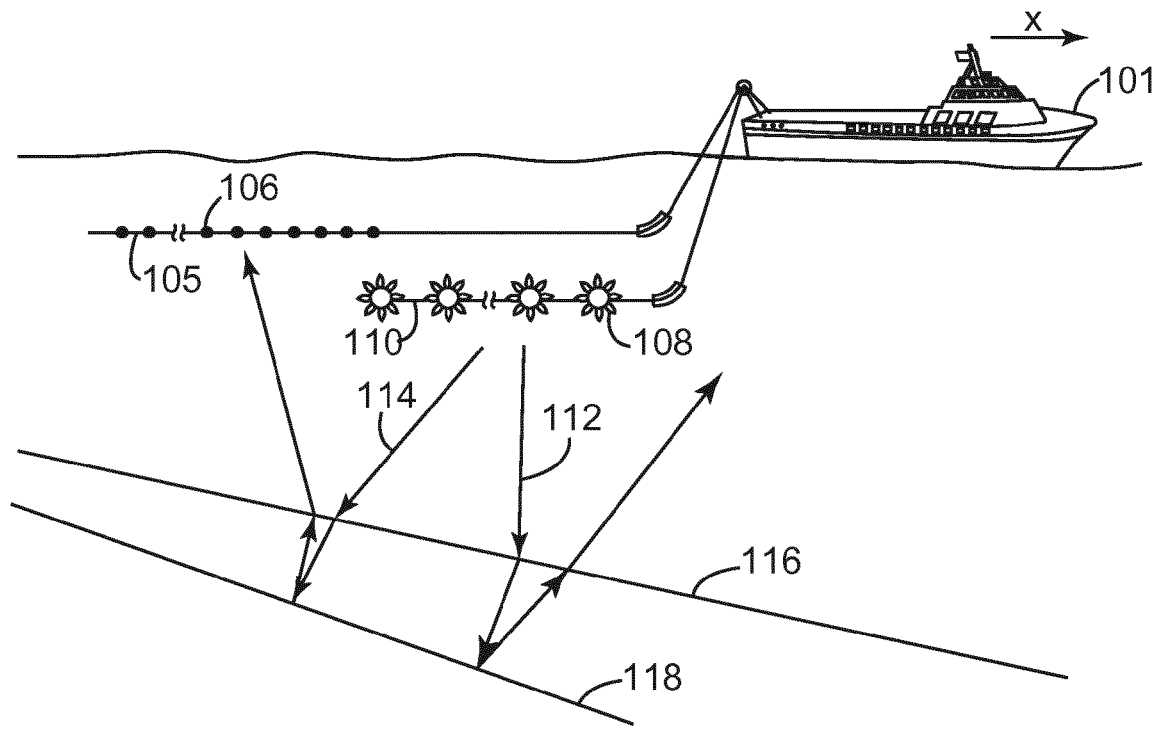
FIG. 1 is schematic diagram of a marine seismic survey system.
Figure 2:
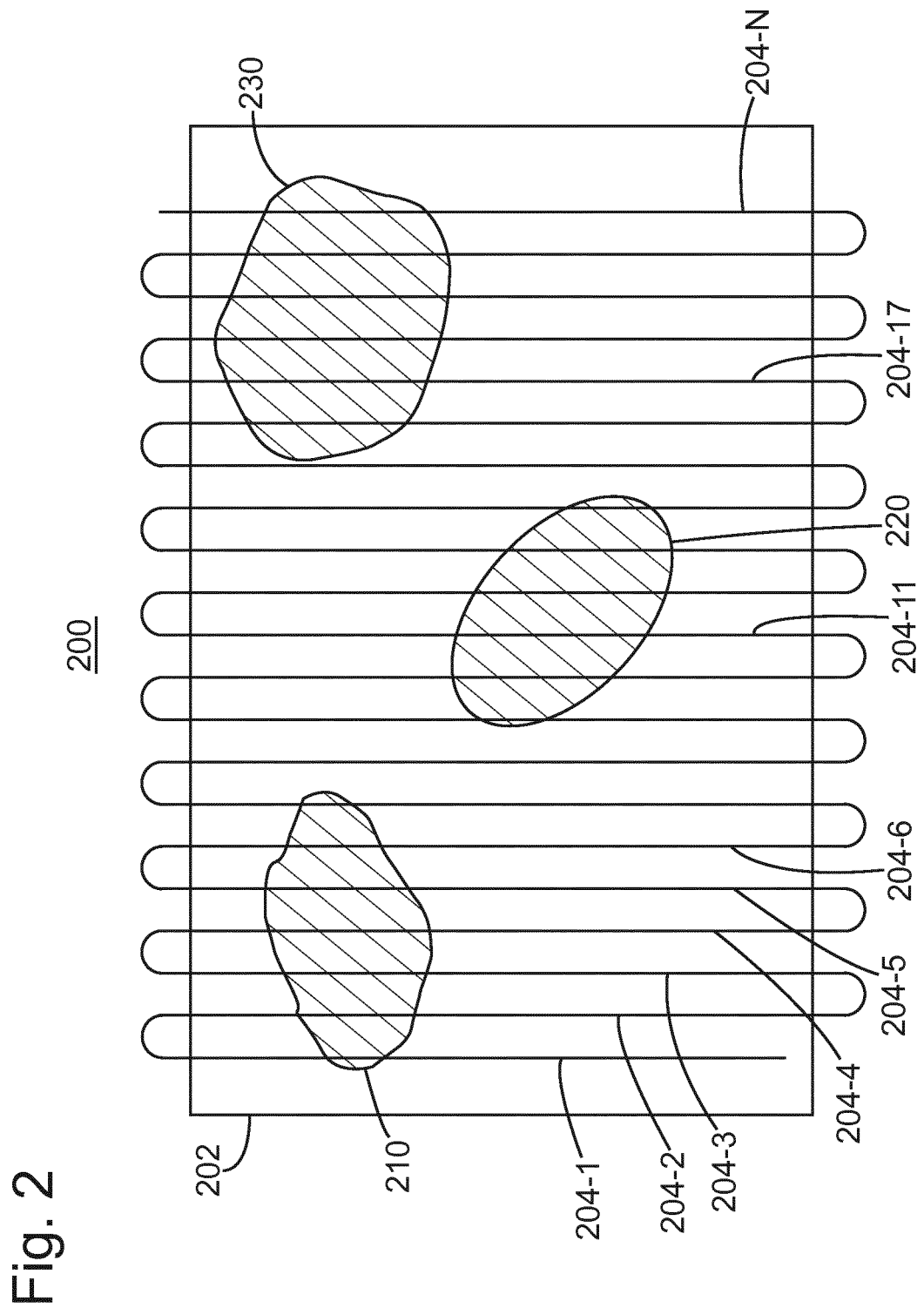
FIG. 2 is a schematic diagram of a marine seismic survey system having regions with different characteristics.

To provide some context for the subsequent discussion of using plural beams of acoustic energy to illuminate a target area for seismic surveying, consider first a survey area as shown in FIG. 2. In some cases, for a given area 202 to be surveyed, prior seismic surveys have been conducted and a new survey is performed to re-collect seismic data in the same area with new techniques in the hope of improving resolution and image quality. Thus, in general, there is some prior knowledge of subterranean features in area 202 that is to be surveyed. Also, because the processing power onboard the seismic vessel has grown significantly, it is possible to produce brute stacks or other intermediate displays that can be used to obtain a "first look" at the data quality and subterranean features.

If prior knowledge for surveyed area 202 is unavailable, then it is possible to run a preliminary survey test 200, e.g., run only a few lines (e.g., lines 204-1, 204-6, 204-11, 204-17 and 204-N, where N can take various values depending on the size of the full survey) of the full survey (204-1 to 204-N). The number of lines of the preliminary survey test is illustrative only. Those skilled in the art would recognize that this number depends on the specific features of the subsurface. For example, if, during the preliminary survey, data acquisition along line 204-11 indicates a likelihood of encountering an area 220 having different characteristics than area 202, the next survey lines may be denser so that the approximate shape of area 220 is identified. The same may happen for other areas detected to be different from area 202. The preliminary survey uses a "scanning source" to help determine favorable angles for target illumination. For the preliminary survey test, the source array may be activated using any beam shape, and seismic data is recorded with the streamer spread. Then, the recorded seismic data may be processed onboard the vessel, or it may be sent to a land processing center for quick processing. Applying known processing algorithms, e.g., migration, mirror migration, full waveform inversion, etc., a basic final image of the area of interest may be determined. Based on this image or other parameters, it may be determined that there are one or more areas (210, 220, or 230) needing special attention during the full survey. As discussed above, these areas may include chalk, salt dome, dipping regions, faults, canyons, methane clathrates, gas zones, etc. that necessitate special attention.

For exemplary purposes, assume that area 210 is identified to be a chalk region, area 220 is identified to be a salt dome and area 230 is identified to include severe dipping regions. Those skilled in the field would understand that these areas' contours are not well defined until a full-scale survey is performed. The contours shown in FIG. 2 are approximate and based on preliminary survey test 200. However, these approximate areas are helpful in fine-tuning acquisition of the full survey. For this particular example, considering that a library of beam form factors $G_i$ already includes elements for the chalk area $G_i^c$, for the dome region $G_i^d$, and for the severe dipping region $G_i^{dr}$, and also considering that the "map" illustrated in FIG. 2 is stored in a controller (not shown) on the vessel, the controller may dynamically select the beam form factors for each source element of the source array during the seismic survey to optimally illuminate each area. In other words, after the various areas' correct form factors are identified, the adaptable source array is adjusted during the full survey so that its beam is directed to illuminate the target zone at a favorable angle for that particular source point based upon the prior scanning source survey result. The favorable angle is likely to change with each source point. Thus, in one application, new form factors are applied only after a preset number of source points have been shot.

Figure 3:
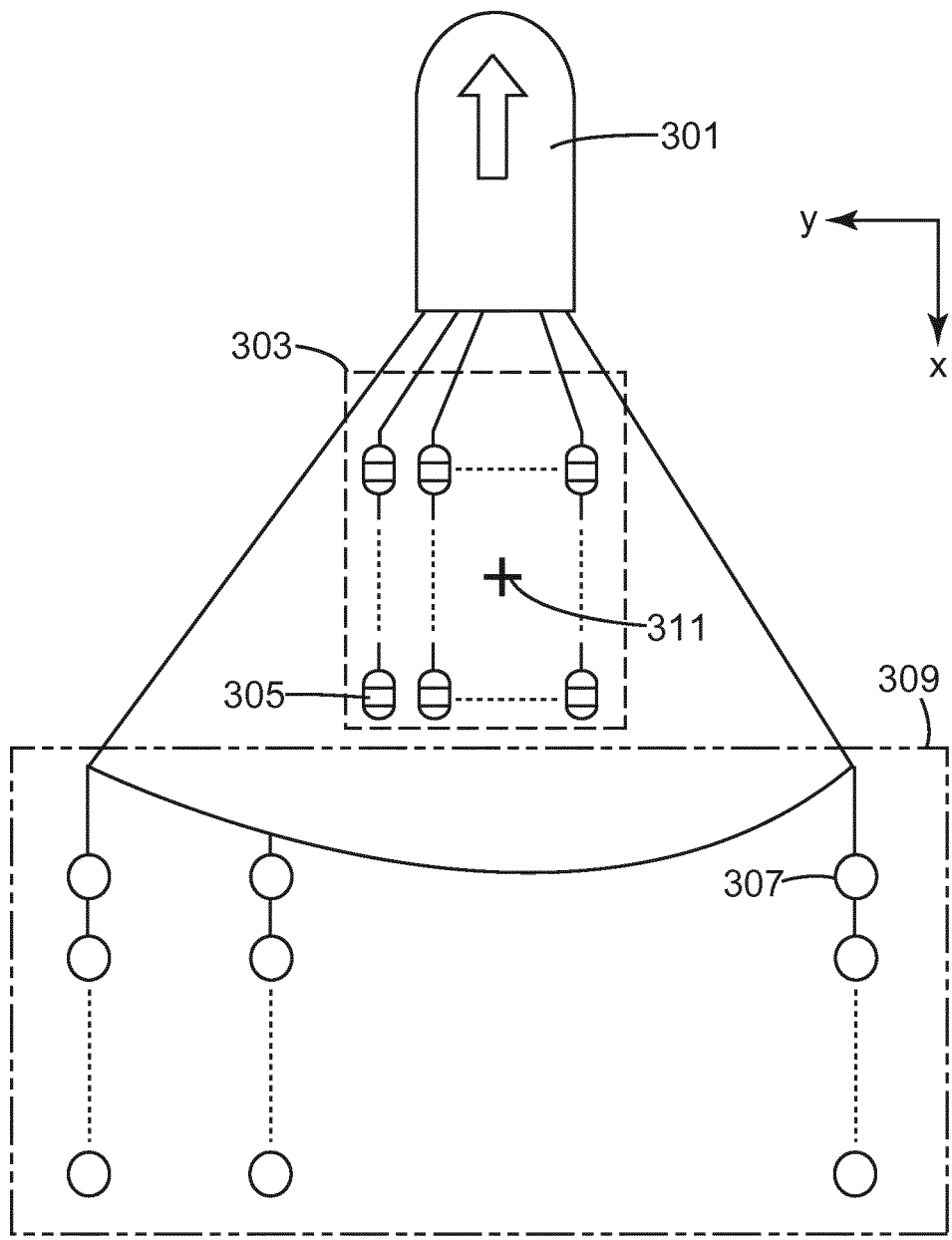
FIG. 3 is a schematic diagram of a source array which can be used to generate multiple beams of acoustic energy.

FIG. 3 illustrates a seismic vessel 301 towing a source array 303 comprised of vibro-acoustic elements 305 that have origin/centroid location 311, and which can be used to generate one or more acoustic beams of energy as discussed below. The vessel 301 also tows a streamer array 309 having multiple receivers 307 to receive the reflected acoustic waves. The vibro-acoustic elements 305 can be located all at a common depth or towed at different depths, an example of the latter configuration being provided below with respect to FIG. 4. Using the source array 303, or other source array configurations, beam steering may be achieved in various ways. For example, because each source array source element may be individually controlled, the entire source array may be controlled in a way that produces a "phased" or "beam steered" array. Ordinarily, source elements are all operated synchronously (in phase with one another), and the source array's dimension is small to avoid directivity notches in particular directions for frequencies of interest, with the objective of the source array uniformly illuminating the target area. However, when trying to image weak targets, it is advantageous to steer source array emissions. One way to change the source array's directivity pattern is to operate multiple source elements at the same phase, but have them operate at different depths. This creates a tilted acoustic wave front; its main lobe attains a maximum at an angle away from vertical. However, in most cases, the source array has a fixed geometry and it can be difficult to modify the source elements' positions in a short time. Also, the vessel 301 is constantly moving, typically traveling in a straight line for a few miles, and then turning around to collect data along a path parallel to the previous pass, but in the opposite direction. Thus, means to change the source acoustic energy directivity pattern that takes into account subterranean geometry, vessel location, and streamer spread location so as to maintain favorable target illumination are valuable.

As an alternative, source elements operating at approximately the same depth can be phased differently. The result is that the source array's directivity pattern can be tilted to approximate the same pattern as source elements operating synchronously at different depths. Phasing can be just a time delay, but because of the surface ghost contribution, in practice, the phasing scheme may be more complicated.

Another factor that can change source array directivity patterns is source element amplitude. While it is ordinarily desirable to operate all source elements at their maximum output, it is anticipated that in some situations it might be desirable to have the output of at least one source element different from the others. The difference in amplitude could be invariant with frequency or change with frequency. For example, a special case might be to use variable amplitudes to tune out the direct arrival (horizontally propagating) energy from the source array that impinges on the near offset hydrophones (see, for example, Sallas, U.S. Pat. No. 4,918, 668, the entire content of which is incorporated herein by reference). Thus, this constraint could be incorporated into a cost function as part of the target directivity pattern.

Because changing the source array's geometry or changing the vessel's path frequently is impractical, electronic beam steering can provide a more practical option to keep the radiated energy directed toward the target in such a fashion that reflected energy useful for imaging could be received and recorded by the streamer spread receivers.

One example of how to steer a source array's beam for achieving desired directivity is now discussed. The beam-steering process can also be used to create ghost notch diversity when the source elements are disposed at different depths. If the source elements are disposed at the same depth, the ghost notch diversity may be achieved for energy propagating away from the vertical angle. For example, in marine acquisition, spectral notches in down-going acoustic energy can occur in the amplitude spectrum of conventional constant depth source arrays due to the effect of destructive interference with the surface reflection. Dual-depth or variable-depth source elements provide means to counter this effect. One option is a curved source array. Because the source elements are located at different depths, reflections will constructively and destructively interfere, causing spectral notches to be filled in when compared to constant depth arrays. Another option might be to use one or more of the source elements at different depths. In other words, it is possible to operate, for a low-frequency sweep (e.g., 5-25 Hz) some source elements at a 25 m depth, and for a high-frequency sweep (e.g., 25-125 Hz), to operate some of the source elements at a 5 m depth.

Figure 4:
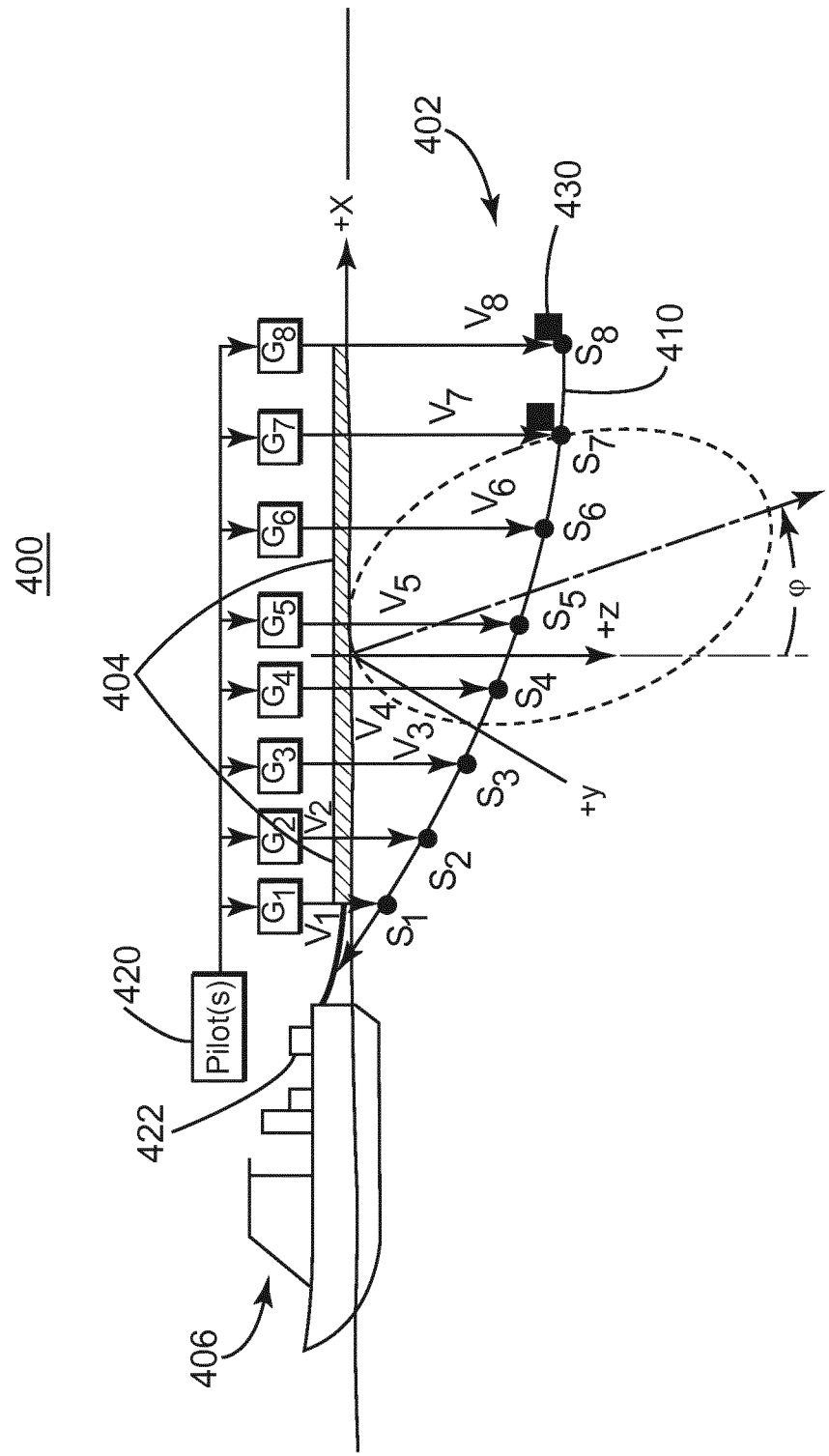
FIG. 4 is another schematic diagram of a source array which can be used to generate multiple beams of acoustic energy.

With regard to FIG. 4, a source array 400 includes at least one source sub-array 402 having plural source elements $S_1$ to $S_8$ suspended from a support device 404 (e.g., a float) attached to a vessel 406. Source elements $S_1$ to $S_8$ are distributed along a curved line 410, which may be a parameterized curve. A pilot signal 420 that can be a conventional swept sine over a predetermined frequency range or some other excitation signal, for example, a band-limited pseudorandom signal, can be convolved with beam form filters $G_1$ to $G_8$ (to be calculated by a process disclosed next) to form drive signals $V_1$ to $V_8$. According to embodiments described below, multiple pilot signals may be used to generate plural beams. The pilot signal(s) and the beam form factors may be processed in a controller 422 on vessel 406 or in a distributed controller that has some parts on the actual source elements. These signals may be stored in the memory of the source controllers 430, which are located at the source elements, on controller 422, or distributed between the source elements and the vessel's controller. Upon receiving a command from the controller 422, sources $S_1$ to $S_8$ emit an acoustic signal using a feedback control system to emit acoustic energy that tracks drive signals $V_1$ to $V_8$. In other words, acoustic emissions of source elements $S_1$ to $S_8$ have the same amplitude and phase spectra as drive signals $V_1$ to $V_8$ that are used as reference signals by the respective source elements $S_1$ to $S_8$ source controllers.

Beam form filters $G_1$ to $G_8$ are designed to adjust the pilot signal phase and/or amplitude to ensure that acoustic energy radiated by the source array is maximized in a preferred direction over a frequency band of interest. In FIG. 4, this preferential angle is the vertical angle φ over a range of azimuths. Not shown in FIG. 4 (but shown in FIG. 5) is the azimuth angle θ, which is useful for describing the beam width. Beam form filters $G_1$ to $G_8$ may be designed, as a function of the source array's geometry, to direct the radiated acoustic energy with a desired vertical angle and/or azimuth angle for illuminating selected features of the subsurface of interest. For more information regarding the usage of source arrays and beam steering in the context of seismic surveying, the interested reader is directed to International Patent Application No. PCT/EP2014/062317, filed on Jun. 13, 2014, entitled "Adaptable Seismic Source for Seismic", the disclosure of which is incorporated herein by reference, hereafter referred to as the "'317 application".

Figure 5:
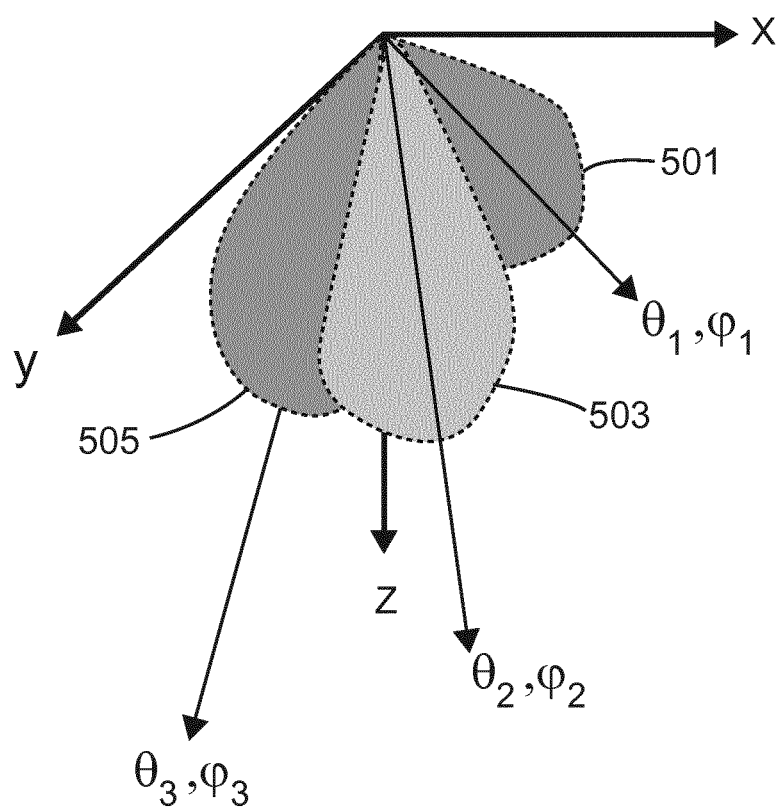
FIG. 5 illustrates multiple beams of acoustic energy with different directivity characteristics.

According to some embodiments herein, multiple pilot signals can be used to drive the source array elements in a manner which generates multiple beams or lobes of acoustic energy with desired vertical and azimuthal angles as shown conceptually in FIG. 5. In this embodiment, three beams 501, 503 and 505 of acoustic energy are generated for illuminating subterranean targets in different ways. The beams 501, 503, 505 can be directed to have different preferred directions (as shown in FIG. 5) or can alternatively some or all can be directed in a common direction but each with a different beam width so that the source illumination aperture can be changed. Still further the beams can each have different effective source origins (centroids) to create a different source offset for each beam. For example, the preferred directions can be directed at different azimuths and or different vertical angles or both, as in FIG. 5, wherein all three beams 501, 503 and 505 share a common origin.

Figure 6A:
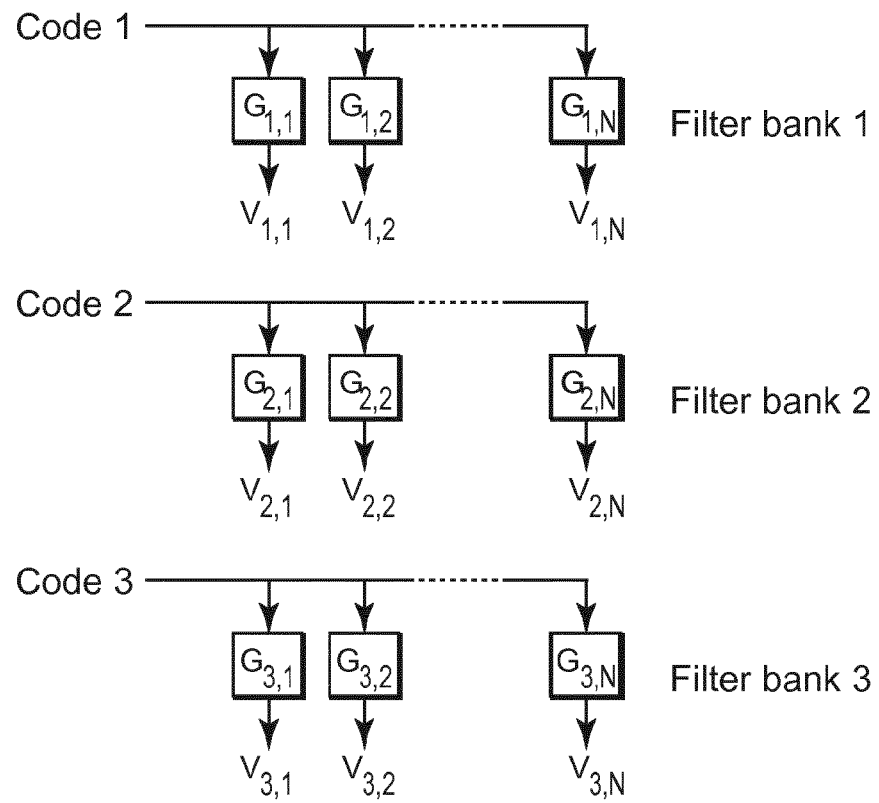
FIG. 6(a) illustrates the convolution of a plurality of coded pilot signals with filter banks to generate preliminary drive signals.
Figure 6B:
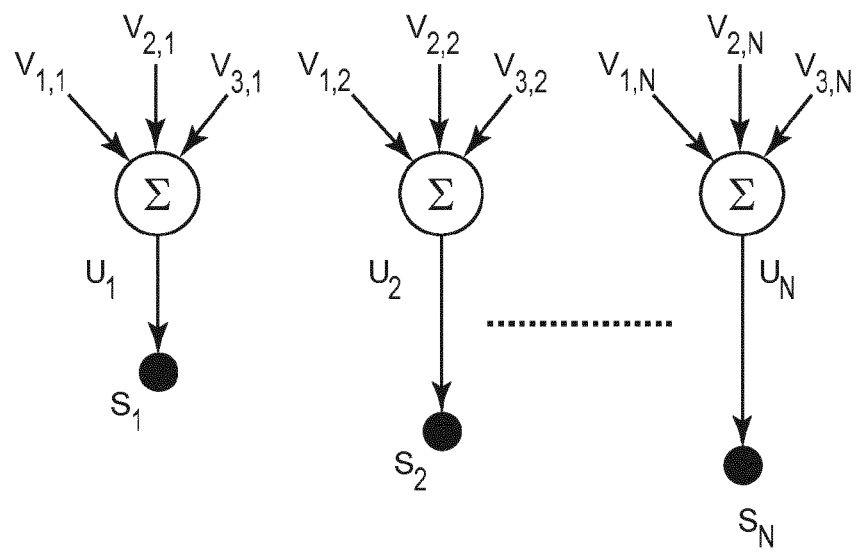
FIG. 6(b) shows the combination or superposition of plural preliminary drive signals to generate composite drive signals for source elements.

If the vibro-acoustic source array elements 305 are sufficiently linear in their response it is possible to superimpose/combine a plurality of coded excitation signals (also referred to herein as pilot or code signals) to form a composite drive signal that can be used to excite a vibro-acoustic device without creating intermodulation distortion noise products. According to an embodiment, the three beam embodiment of FIG. 5 can be generated as shown in FIGS. 6(a) and 6(b). Therein, three differently coded pilot signals (Code 1, Code 2 and Code 3) can be convolved with three banks of directivity filters (as shown in FIG. 6(a)) that can be combined and used to create a suite of drive signals ($U_1, \ldots U_N$, as shown in FIG. 6(b)) and then applied to the vibro-acoustic elements ($S_1 \ldots S_N$) within a towed array, e.g., array 303. The resulting radiated energy can be received by the hydrophone streamer array 309, in the form of reflections, and later deblended or separated if an orthogonal coding scheme is employed.

Figure 7:
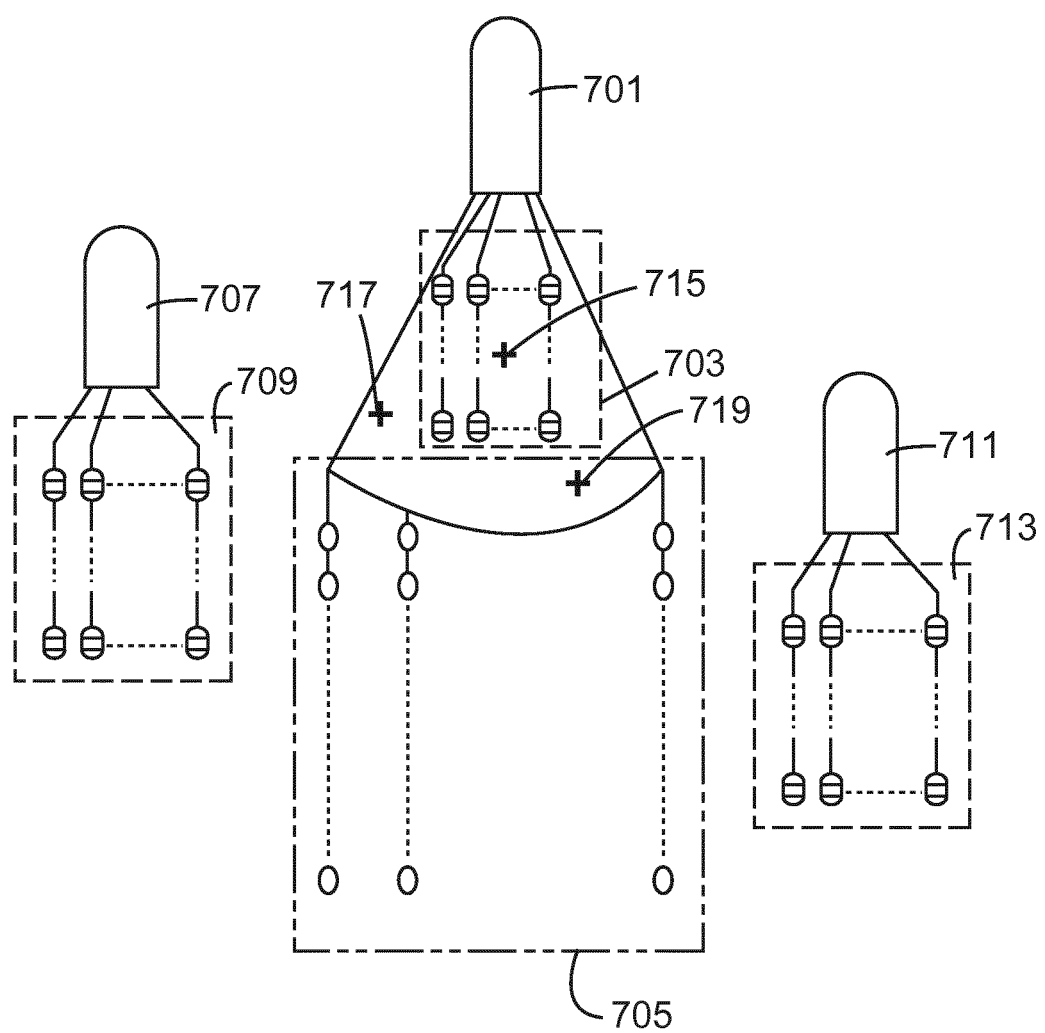
FIG. 7 is a schematic diagram of another source array, towed by multiple vessels, which can be used to generate multiple beams of acoustic energy.

The source array 303 need not be limited to an array towed behind a single vessel 301 as depicted in FIG. 3, but these plural beam steering, seismic acquisition techniques could also be applied to the source elements within a super-array, an example of which is depicted in FIG. 7. In this example, three towing vessels 701, 707 and 711 tow three source arrays 703, 709 and 713, respectively. Vessel 701 also tows a streamer array 705. By using different source elements in different ones of the arrays 703, 709 and 713 to comprise at least a portion of each coded beam it is possible to spatially shift or offset the various beams from one another as is indicated by the three beam origins in FIG. 7 shown as 715, 717 and 719. Alternatively, this spatial shift could be realized by using different amplitude levels and/or an amplitude weighting when combining the various beam signals to form the drive signals ($U_1 \ldots U_N$). Moreover, it will also be appreciated by those skilled in the art that some of the filter elements within a particular filter bank can be set to zero so that a particular source is not used to emit a particular code.

Figure 8:
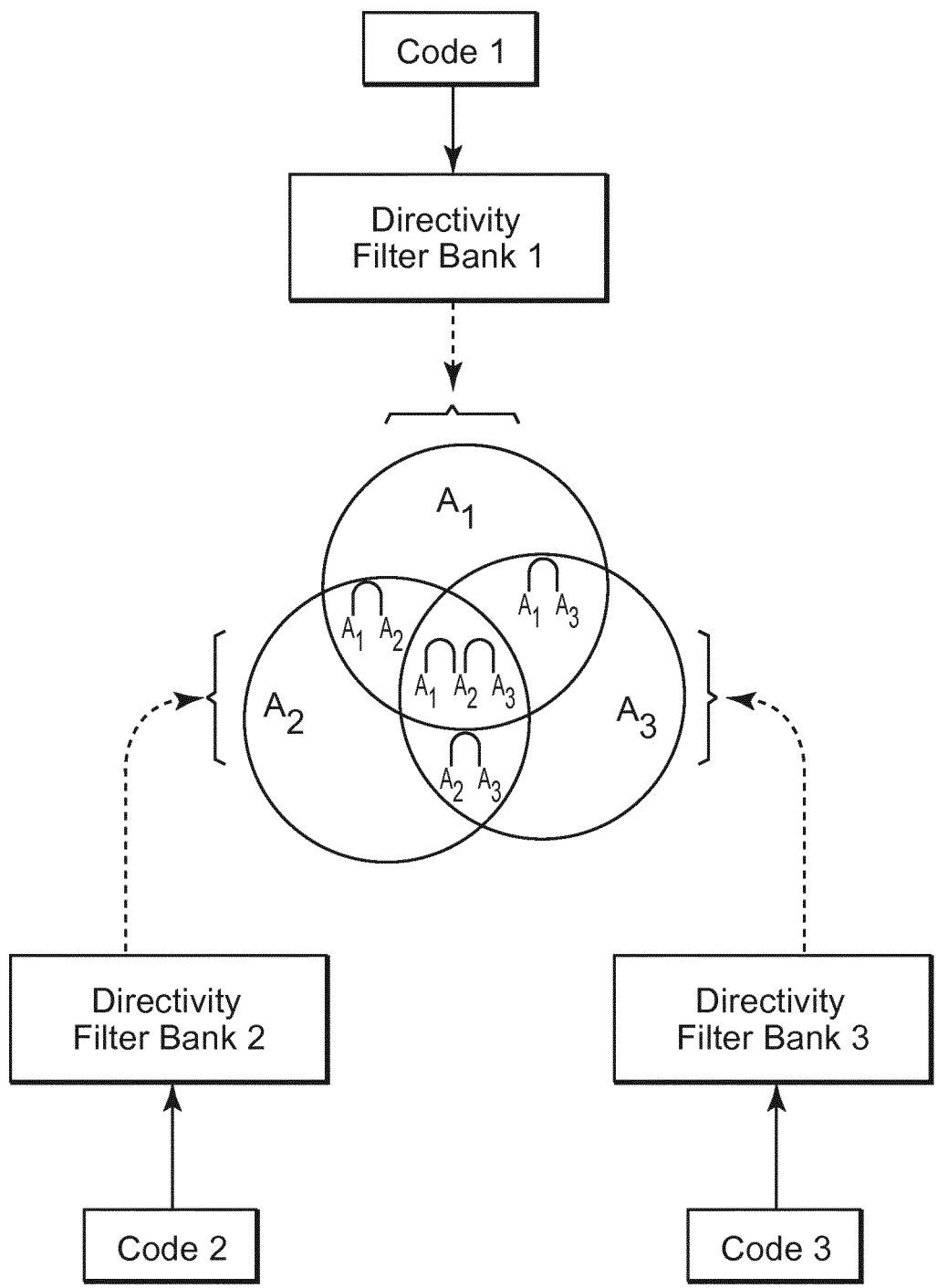
FIG. 8 is a schematic Venn diagram showing a combination of preliminary drive signals to generate composite drive signals according to an embodiment.

FIG. 8 illustrates some of the multiple beam steering possibilities that might arise according to various embodiments using a Venn diagram. Assume that Venn circle A1 is the set of vibro-acoustic elements required to form beam 501, that Venn circle A2 is the set of vibro-acoustic elements required to form beam 503; and that Venn circle A3 represents all of the vibro-acoustic elements needed to form beam 505. Thus, in this example, it can be seen that there is some overlap in the source elements which are used to form the various beams of acoustic source energy. So, for source elements located in the intersecting regions of the Venn circles, these vibro-acoustic sources may have composite drive signals that contain two or more coded signals so that there is simultaneous emission of more than one coded source signal occurring in these elements. Conversely, for other source elements located in the non-intersecting regions of the Venn diagram, those source elements may have drive signals that have a contribution from only one pilot signal.

Various types of signals can be used as the plural different code, pilot or sweep signals mentioned in the above embodiments. For example, and without limitation, code 1, code 2 and code 3 illustrated in FIG. 8 can be implemented as three different pseudorandom sequences, e.g., orthogonal or pseudo-orthogonal sweeps, which are uncorrelated with each other over a time interval of interest. One way to construct pseudorandom signals that are uncorrelated over some time interval of interest (+/− listen time) is taught in U.S. Pat. No. 7,859,945, the disclosure of which is incorporated here by reference.

Figure 9:
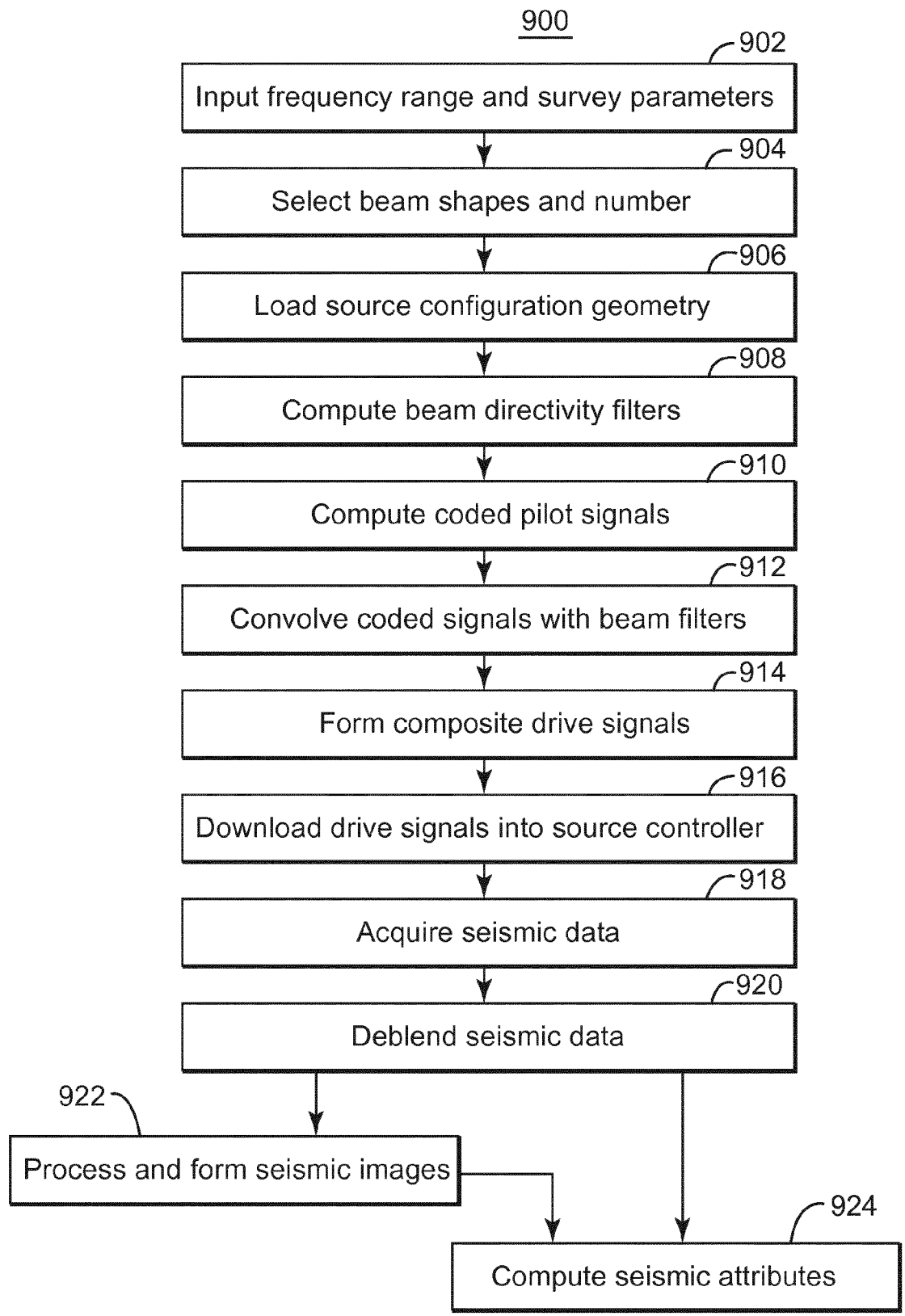
FIG. 9 is a flowchart of a method for acquiring seismic data with an adjustable source array and multiple beams of acoustic energy according to an embodiment.

These embodiments can, for example, be expressed in terms of various seismic acquisition methods or systems. One such embodiment is illustrated in the flowchart of FIG. 9. FIG. 9 generally illustrates a process to create the composite drive signals, acquire the survey data and finally deblend or separate the data sets according to an embodiment. Starting with step 902, the process begins with the input of the frequency range(s) to be used in the transmitted acoustic energy and other survey parameters as will be known to those skilled in the art. Then, the number and shapes of the plural beams are selected in step 904. As a practical matter, the number of different beams that can be formed will be limited by the number and location of the various source elements—control/design of more than three beams operating simultaneously may be a challenge, although the present invention is not limited to three or fewer beams. In general, the preferred direction of the beams will in part be determined by several factors: the relative position of the source elements with respect to the selected target to be imaged and the streamer(s) position, the vessel direction and the dip angle of the target reflector. In an embodiment, a first vessel may be towing both a source array and a set of streamers, while a second source vessel operates at some crossline offset. In this case, a first beam may be directed toward the back of the vessel towing the streamer while a second beam may simultaneously be directed toward the target in a direction about normal to the reflection plane, while a third beam could be more omnidirectional or the third beam could be directed toward a second target of interest. Another option, for example, where there is little prior knowledge of the survey area, would be to direct the beams deliberately in two or three different directions, primarily downward but tilted at different azimuth angles (for example 30 degrees apart), in processing after the records have been deblended, the separated records could be recombined to form a new record where the angle of illumination can be changed.

The source configuration geometry is loaded at step 906, e.g., the X, Y, and Z position of each source element in one or more source arrays used to generate the acoustic waves. Based on the inputs provided for in steps 902, 904 and 906, the beam directivity filters G and the coded pilot signals are computed in steps 908 and 910, respectively. These computations can, for example, be performed as described (for multiple beam directivity filters and individual pilot signals) in the above-incorporated by reference '317 application. However, to assist the reader in understanding these steps, an example is provided below with respect to FIG. 10.

The coded pilot signals are convolved with the beam filters at step 912 and then combined or superimposed together to form the composite drive signals at step 914, for example as described above with respect to FIGS. 6(a) and 6(b). The drive signals can then be downloaded into one or more source controllers at step 916, which operate the individual continuous vibratory source elements using the drive signals. The seismic data is then acquired at step 918, e.g., by receiver elements such as hydrophones, geophones or the like, which data is recorded for further processing either onboard the acquisition vessel(s) or onshore.

For example, if the coded pilot sequences computed at step 910 are sufficiently orthogonal, they can be deblended at step 920 by cross-correlation with the different coded pilot signals. The correlation process will also compress the data set to resemble data that might be acquired using impulsive sources. The correlated data sets are input to other processing sequences (not specifically shown in FIG. 9, but generally represented by step 922) to produce an image. Other processing methods such as source signature deconvolution or a least squares inversion process could also be used to deblend the data set and form multiple images. The resulting images could be differenced, combined to increase spatial resolution or analyzed in other steps not shown to compute gradients, seismic attributes or features that are useful for detection of hydrocarbons or useful for further characterization of the subterranean geology as generally represented by step 924.

Figure 10:
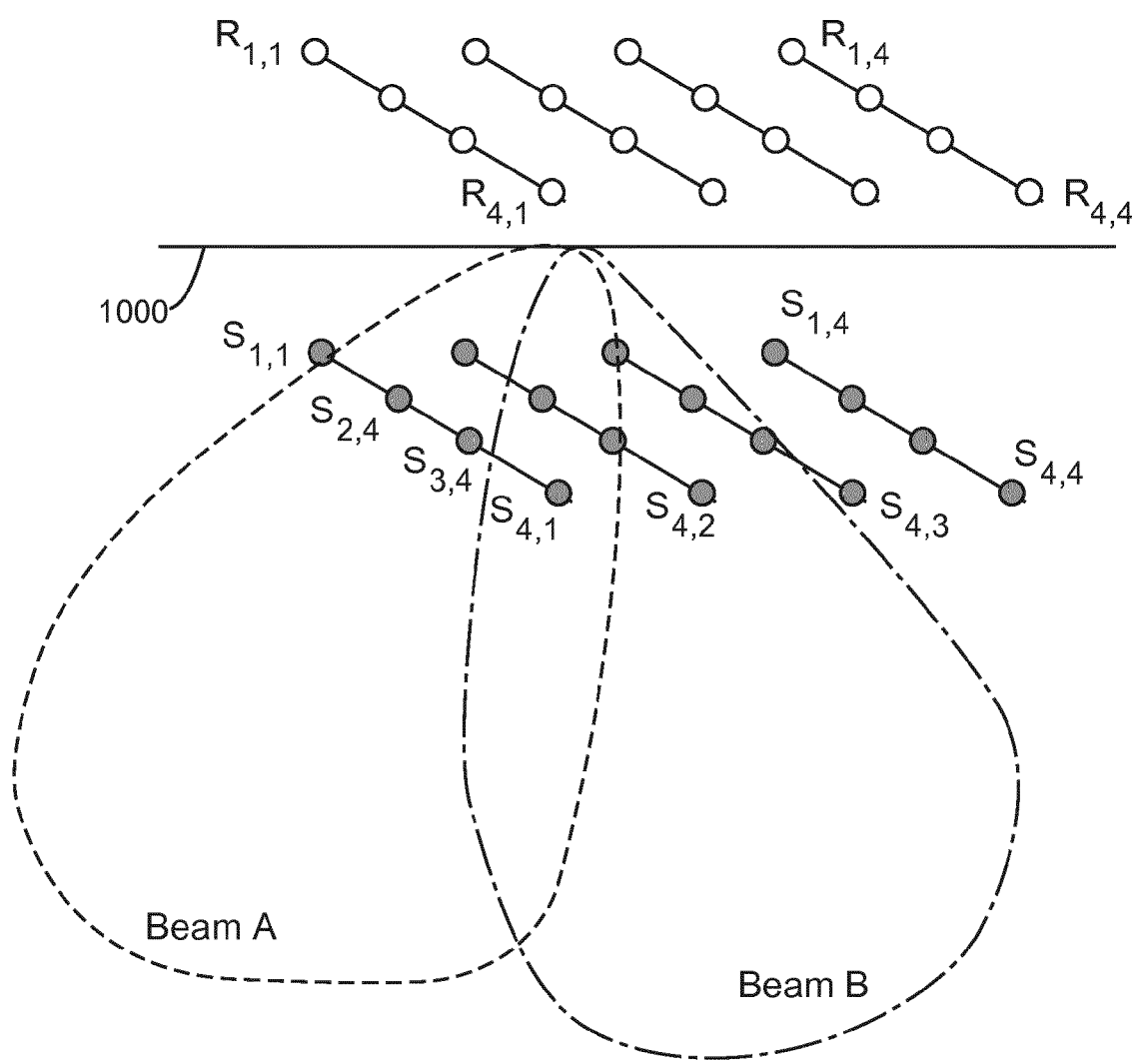
FIG. 10 illustrates beam forming for a two beam, sixteen source element array embodiment.

FIG. 10 illustrates how steps 908-914 of the above-described seismic acquisition method could be implemented for a purely illustrative source/receiver geometry. Therein, 16 source elements are towed at the same depth below the water's surface 1000 behind a vessel (not shown in FIG. 10), i.e., using four towed lines each with four source elements each. The signals emitted by each source element are labeled as $S_{1,1}$, $S_{1,2}$ ... $S_{4,4}$ where the first subscript is the tow line index and the second subscript represents the element position number in a particular towed line. Suppose that this particular seismic acquisition design is intended to direct the seismic emissions from the array in two different directions simultaneously, and call the first directed energy Beam A and the second directed energy Beam B. Below, in the calculation of the directivity pattern and phase shift filter operators, the contribution of the surface ghost labeled $R_{1,1}$, $R_{1,2}$ ... $R_{4,4}$ may or may not be included, but are not mentioned below for simplicity. One reason for not including the water surface reflection in the directivity pattern/phase shift calculations is that in many cases the "ghost" is removed during processing of the acquired seismic data. If this is the case it may be preferable to calculate the beam form filter operators based on only the primary signals, that is to assume the sources operate in a free-field with no surface ghost effect; because after deghosting the effective source array directivity will behave as if the sources were operated in a free-field.

Further assume that two pseudorandom signals are used to generate the drive signals, referred to here as Pilot A and Pilot B, where A and B are designed to be pseudo-orthogonal signals or uncorrelated signals as mentioned above. Now for purposes of illustration, assume that an array 2A of phase shift filter operators $\{2A_{1,1}(f) \ldots 2A_{4,4}(f)\}$ have been computed for each frequency f of Pilot A signal so that when the resultant drive signals are emitted by the corresponding source elements they combine to create an emission directivity pattern corresponding to Beam A. More specifically, drive signals $a_{1,1}(k), \ldots a_{4,4}(k)$, where k is a time index can be formed by taking an inverse FFT's of the various products: $A_{1,1}(f)=\text{Pilot } A(f) \cdot 2A_{1,1}(f)$, $A_{2,1}(f)=\text{Pilot } A(f) \cdot 2A_{2,1}(f), \ldots, A_{4,4}(f)=\text{Pilot } A(f) \cdot 2A_{4,4}(f)$, that represent a convolution of the phase shift filter with the Pilot A.

Furthermore, assume that an array 2B of phase shift filter operators $\{2B_{1,1}(f) \ldots 2B_{4,4}(f)\}$ have been computed for each frequency f of Pilot B signal so that when the resultant drive signals are emitted by the corresponding source elements they combine to create an emission directivity pattern corresponding to Beam B. More specifically, drive signals $b_{1,1}(k), \ldots b_{4,4}(k)$, where k is a time index can be formed by taking an inverse FFT's of the various products: $B_{1,1}(f)=\text{Pilot } B(f) \cdot 2B_{1,1}(f)$, $B_{2,1}(f)=\text{Pilot } B(f) \cdot 2B_{2,1}(f), \ldots, B_{4,4}(f)=\text{Pilot } B(f) \cdot 2B_{4,4}(f)$, that represent a convolution of the phase shift filter with the Pilot B.

Coded directivity drive signals $S_{1,1}, S_{1,2} \ldots S_{4,4}$ are then formed by combining the drive signals $a_{1,1}(k), \ldots a_{4,4}(k)$, and $b_{1,1}(k), \ldots b_{4,4}(k)$. In an embodiment, the combination can be merely a summation of the two signals, that is $S_{1,1}(k)=a_{1,1}(k)+b_{1,1}(k)$, $S_{1,2}(k)=a_{1,2}, b_{1,2}(k), \ldots, S_{4,4}=a_{4,4}(k)+b_{4,4}(k)$. In another embodiment, the amplitude of the signals may be adjusted to ensure that equipment constraints are not exceeded.

Figure 11:
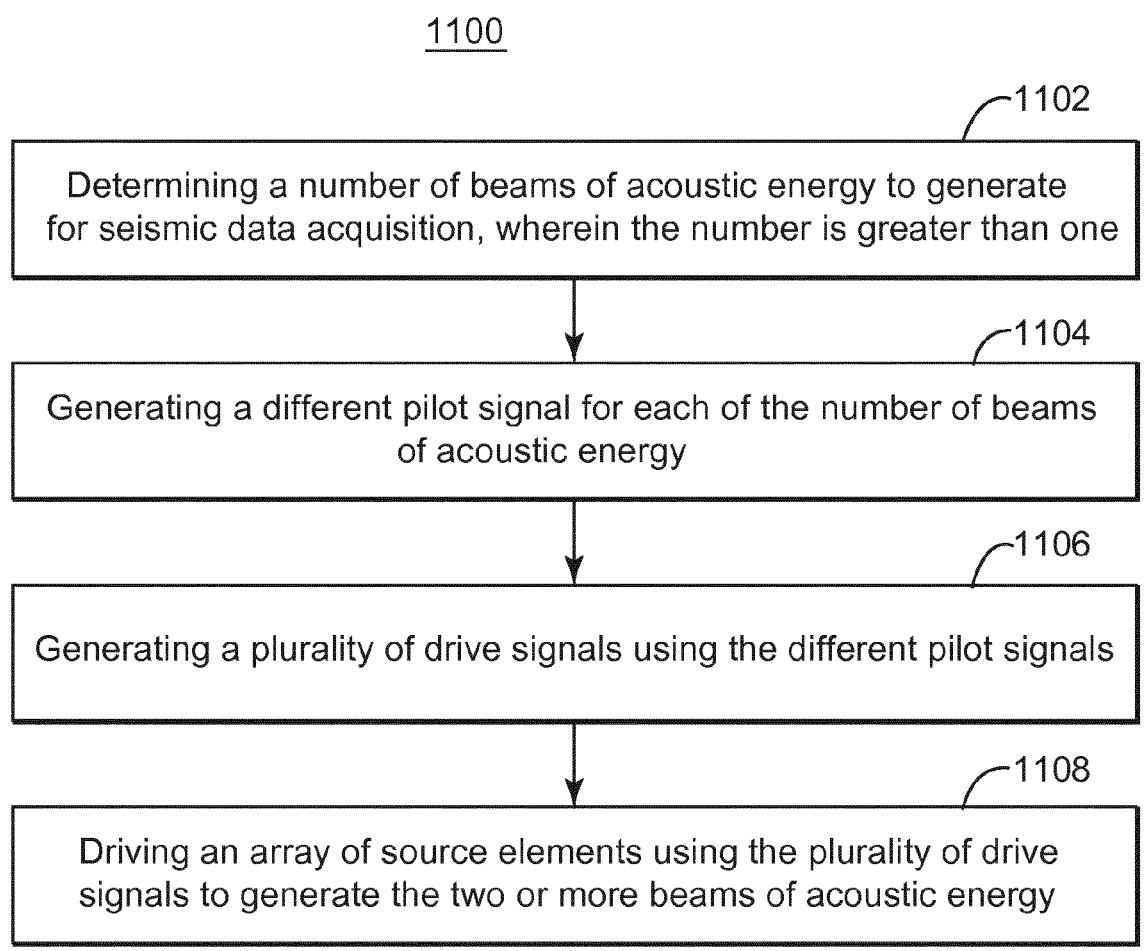
FIG. 11 is another flowchart of a method for acquiring seismic data with an adjustable source array and multiple beams of acoustic energy according to an embodiment.

Another method 1100 for seismic data acquisition according to an embodiment is illustrated in FIG. 11. Therein, the number of beams of acoustic energy to be formed (e.g., two or more) for the seismic data acquisition are determined or selected at step 1102. A different pilot signal is then generated for each of the number of beams of acoustic energy at step 1104, which in turn are used to generate the plurality of drive signals at step 1106, e.g., as described above. The drive signals are then used to drive an array of source elements to generate the two or more beams of acoustic energy at step 1108.

Figure 12:
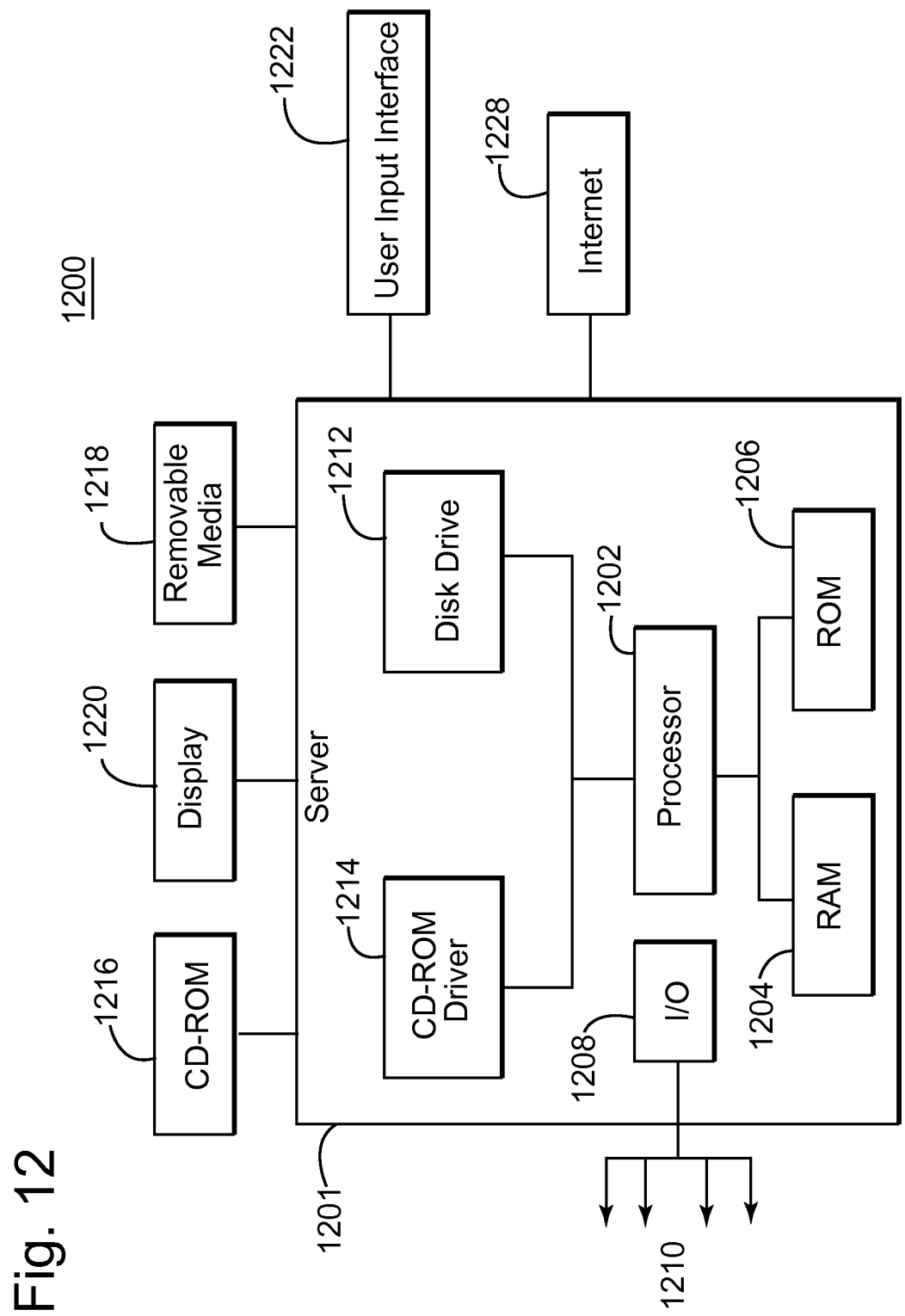
FIG. 12 is a schematic diagram of a control system.

In addition to methods, embodiments can also be expressed as systems which are capable of performing such methods. An example of a representative control system capable of carrying out operations in accordance with the exemplary embodiments discussed above is illustrated in FIG. 12. Hardware, firmware, software or a combination thereof may be used to perform the various steps and operations described herein.

The exemplary control system 1200 suitable for performing the activities described in the above-noted embodiments may include server 1201. Such a server 1201 may include a central processor unit (CPU) 1202 coupled to a random access memory (RAM) 1204 and to a read-only memory (ROM) 1206. ROM 1206 may also be other types of storage media to store programs, such as programmable ROM (PROM), erasable PROM (EPROM), etc. Processor 1202 may communicate with other internal and external components through input/output (I/O) circuitry 1208 and bussing 1210, to provide control signals and the like. For example, processor 1202 may communicate with the sensors, electromagnetic actuator system and/or the pressure equalization mechanism of the source element. Processor 1202 carries out a variety of functions as are known in the art, as dictated by software and/or firmware instructions.

Server 1201 may also include one or more data storage devices, including hard and disk drives 1212, CD-ROM drives 1214, and other hardware capable of reading and/or storing information, such as a DVD, etc. In one embodiment, software for carrying out the above-discussed steps may be stored and distributed on a CD-ROM 1216, removable media 1218 or other form of media capable of portably storing information. These storage media may be inserted into, and read by, devices such as the CD-ROM drive 1214, the disk drive 1212, etc. Server 1201 may be coupled to a display 1220, which may be any type of known display or presentation screen, such as LCD, plasma displays, cathode ray tubes (CRT), etc. A user input interface 1222 is provided, including one or more user interface mechanisms such as a mouse, keyboard, microphone, touch pad, touch screen, voice-recognition system, etc.

Server 1201 may be coupled to other computing devices, such as the equipment of a vessel, via a network. The server may be part of a larger network configuration as in a global area network (GAN) such as the Internet 1228, which allows ultimate connection to the various landline and/or mobile client/watcher devices.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices or magnetic storage devices such as a floppy disk or magnetic tape. Other non-limiting examples of computer-readable media include flash-type memories or other known types of memories. The system may further include the source elements, receiver elements, source control elements and/or any of the hardware described above with respect to seismic acquisition systems.

It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic data acquisition, the method comprising:
   determining a number of beams of acoustic energy to be simultaneously generated by an array of seismic sources for said seismic data acquisition, wherein the number is greater than one;
   generating a different pilot signal for each of the number of beams of acoustic energy;
   convolving each of the different pilot signal with a corresponding beam filters bank to generate preliminary drive signals;
   generating a plurality of drive signals using the different pilot signals, wherein this step includes adding or superimposing at least two of the preliminary drive signals together to generate one of the plurality of drive signals for at least one source element of the array of source elements; and
   driving the array of source elements using the plurality of drive signals to generate the two or more beams of acoustic energy,
   wherein the at least one source element simultaneously contributes to the two or more beams of acoustic energy.

2. The method of claim 1, wherein the step of determining the number of beams further comprises:
   selecting either two or three as the number of beams of acoustic energy to be generated.

3. The method of claim 1, wherein the step of generating the different pilot signals further comprises:
   selecting two or three pseudorandom signals which are uncorrelated with each other over a time interval of interest.

4. The method of claim 1, wherein each of the plurality of beams has a directivity which is described by a vertical angle between the beam and gravity, and by an azimuth angle of the beam.

5. The method of claim 4, wherein each of the plurality of beams have the same vertical angle, but different azimuth angles.

6. The method of claim 4, wherein each of the plurality of beams have different vertical angles but the same azimuth angles.

7. The method of claim 4, wherein each of the beams has a same point of origin.

8. The method of claim 4, wherein at least one of the beams has a different point of origin than the other beams.

9. The method of claim 1, wherein at least one of the drive signals has a contribution from only one of the pilot signals.

10. The method of claim 1, further comprising:
    receiving reflections of the beams of acoustic energy at a plurality of receivers to generate received signals; and
    deblending the received signals to separate contributions from the two or more beams.

11. A seismic acquisition system comprising:
    a processor configured to generate a different pilot signal for each of a plurality of beams of acoustic energy that are simultaneously emitted by an array of seismic sources;
    a plurality of beam form filters ($G_{1,1} \ldots G_{3,N}$) used to convolve the different pilot signals and to generate preliminary drive signals using the different pilot signals;

a plurality of combining elements configured to generate a plurality of drive signals using the different pilot signals, by adding or superimposing at least two of the preliminary drive signals together to generate one of the plurality of drive signals for at least one source element of the array of source elements; and the at least one array of source elements which are driven by the plurality of drive signals to generate the plurality of beams of acoustic energy, wherein the at least one source element simultaneously contributes to the plurality of beams of acoustic energy.

12. The system of claim 11, wherein the processor is configured to generate the different pilot signals by selecting two or three pseudorandom signals which are uncorrelated with each other over a time interval of interest.

13. The system of claim 12, wherein each of the plurality of beams has a directivity which is described by a vertical angle between the beam and gravity, and by an azimuth angle of the beam.

14. The system of claim 13, wherein each of the plurality of beams have the same vertical angle, but different azimuth angles.

15. The system of claim 13, wherein each of the plurality of beams have different vertical angles but the same azimuth angles.

16. The system of claim 13, wherein each of the beams has a same point of origin.

17. A non-transitory computer readable medium containing program instructions which, when executed by a suitable computer processing device, performs the steps of:

generating a different pilot signal for each of a plurality of beams of acoustic energy;

convolving each of the different pilot signal with a corresponding beam filters bank to generate preliminary drive signals;

generating a plurality of drive signals using the different pilot signals, wherein this step includes adding or superimposing at least two of the preliminary drive signals together to generate one of the plurality of drive signals for at least one source element of an array of source elements; and driving the array of source elements using the plurality of drive signals to generate the two or more beams of acoustic energy, wherein the at least one source element simultaneously contributes to the two or more beams of acoustic energy.

* * * * *